United States Patent [19]

Appeldorn et al.

[11] Patent Number: 5,432,876
[45] Date of Patent: Jul. 11, 1995

[54] ILLUMINATION DEVICES AND OPTICAL FIBRES FOR USE THEREIN

[75] Inventors: Roger H. Appeldorn, Grant Township, Washington County, Minn.; Alan G. Hulme-Lowe, Bishops Stortford; Michael C. Lea, Harlow, both of England

[73] Assignee: Minnesota Mining and Manufacturing Company, Saint Paul, Minn.

[21] Appl. No.: 963,056

[22] Filed: Oct. 19, 1992

[51] Int. Cl.⁶ ............................ F21V 8/00; G02B 6/24
[52] U.S. Cl. .................................... 385/31; 362/32; 385/47; 385/901
[58] Field of Search .................... 362/32; 385/15, 31, 385/32, 39, 44, 45, 47, 48, 123, 147, 901

[56] References Cited

U.S. PATENT DOCUMENTS

| | | | |
|---|---|---|---|
| 4,059,916 | 11/1977 | Tachihara et al. | 40/130 K |
| 4,171,844 | 10/1979 | Landaal et al. | 296/57 R |
| 4,173,390 | 11/1979 | Käch | 385/44 |
| 4,234,907 | 11/1980 | Daniel | 362/32 |
| 4,285,889 | 8/1981 | Parsons | 264/2.6 |
| 4,307,932 | 12/1981 | Winzer | 385/48 |
| 4,422,719 | 12/1983 | Orcutt | 350/96.30 |
| 4,447,118 | 5/1984 | Mulkey | 385/47 X |
| 4,460,940 | 7/1984 | Mori | 362/32 |
| 4,466,697 | 8/1984 | Daniel | 350/96.30 |
| 4,471,412 | 9/1984 | Mori | 362/32 |
| 4,519,017 | 5/1985 | Daniel | 362/32 |
| 4,575,180 | 3/1986 | Chang | 385/47 |
| 4,576,436 | 3/1986 | Daniel | 350/96.10 |
| 4,642,736 | 2/1987 | Masuzawa et al. | 362/31 |
| 4,648,690 | 3/1987 | Ohe | 350/321 |
| 4,690,490 | 9/1987 | Mori | 385/47 |
| 4,729,068 | 3/1988 | Ohe | 362/31 |
| 4,743,410 | 5/1988 | Grethen et al. | 264/1.4 |
| 4,822,123 | 4/1989 | Mori | 350/96.10 |
| 4,865,417 | 9/1989 | Yamamoto Naohiro et al. | 350/96.30 |
| 4,885,663 | 12/1989 | Parker | 362/32 |
| 4,907,132 | 3/1990 | Parker | 362/32 |
| 4,929,169 | 5/1990 | Fujigaki et al. | 425/385 |
| 5,005,931 | 4/1991 | Mori | 385/901 X |
| 5,037,172 | 8/1991 | Hekman et al. | 385/31 |
| 5,050,946 | 9/1991 | Hathaway et al. | 385/901 X |
| 5,187,765 | 2/1993 | Muehlemann et al. | 385/901 X |
| 5,226,105 | 7/1993 | Myers | 385/147 |

FOREIGN PATENT DOCUMENTS 53-29740  3/1978  Japan .................. 385/44

*Primary Examiner*—John D. Lee
*Attorney, Agent, or Firm*—Gary L. Griswold; Walter N. Kirn; Stephen W. Buckingham

[57] ABSTRACT

An optical fibre has a light emitting region. In the light emitting region are reflecting surfaces, at least one of which has a cross sectional area less than that of the fibre. Light striking the reflecting surfaces will be reflected out of the fibre.

21 Claims, 5 Drawing Sheets

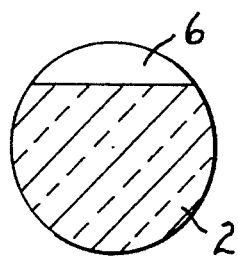
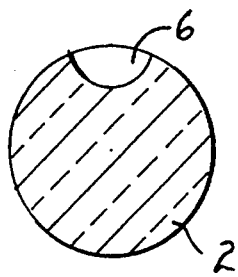
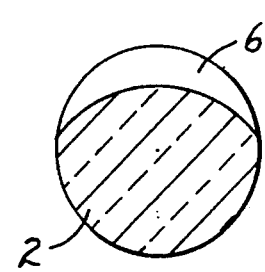
Fig.3a     Fig.3b     Fig.3c
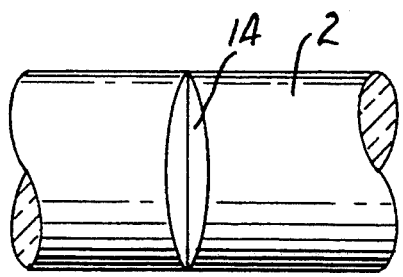
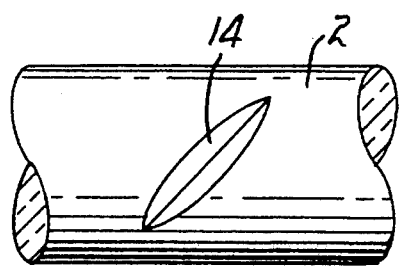
Fig.4a     Fig.4b
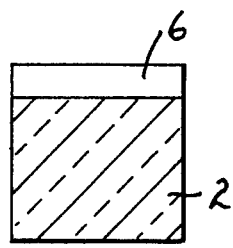
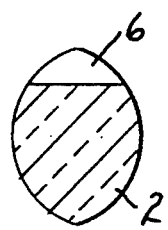
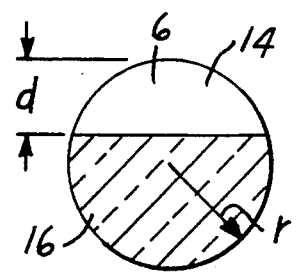
Fig.5a     Fig.5b     Fig.6b
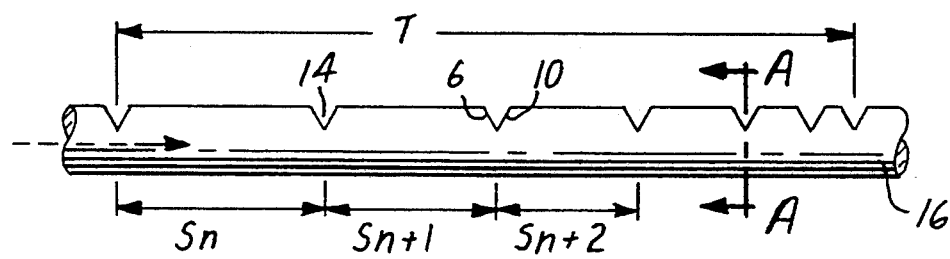
Fig.6a
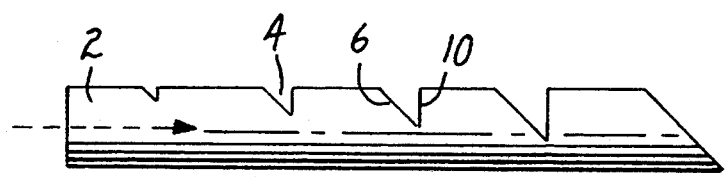
Fig.7

ILLUMINATION DEVICES AND OPTICAL FIBRES FOR USE THEREIN

The present invention relates to optical fibres provided with a series of optical elements of controlled morphology, pattern and spacing which find particular utility as a means of illumination. The invention also relates to illumination devices incorporating such optical fibres.

Optical fibres comprise a core, generally of an inorganic glass or a synthetic plastics resin, and a cladding material having a lower refractive index than the core material which confines the light energy to propagate in the core by total internal reflection. The efficiency of propagation increases as the difference in refractive index between the core and cladding increases. For many purposes, air may constitute the cladding.

The use of optical fibres as means for transmitting data has received widespread interest, with information transfer using a modulated light beam guided by a glass or plastics fibre for telecommunication, computer and data base purposes now commonplace.

U.S. Pat. Nos. 4,171,844, 4,885,663 and 4,907,132, and German Patent No. 3801385 disclose various illumination devices in which a plurality of optical fibres are woven or plaited together to form a strip material. Light is encouraged to leave each fibre through its side wall by the relatively sharp bends imposed upon the fibre by the act of weaving/platting the material. A portion of the light incident upon each bend exceeds the critical angle for internal reflection and escapes from the fibre. However, the weaving/platting operation is mechanically demanding on the fibres, often causing breakages which result in portions of the material remaining 'dark'. Furthermore, as the material depends on the transmitted light exceeding the critical angle for internal reflection at the bends of the weave/plait, light is emitted in all directions at once. In addition, the material, by its very nature, cannot lie flat and is only marginally flexible, thereby limiting its potential applications.

U.S. Pat. No. 4,865,417 discloses an illumination device comprising a bundle of optical fibres in which the light transmitted therethrough is radiated from the end walls of the fibres. However, as the minimum bend radius which can be achieved with optical fibres is relatively large, the devices are relatively bulky. Similarly, as the diameter of the core of the fibre is the minimum 'pixel' size of the device, each fibre needs to be well spaced from its neighbour to preserve the mechanical integrity of the device, thereby further increasing its size. In addition, such devices are non-flexible since a degree of rigidity is needed to secure the fibres in the correct orientation.

French Patent No. 2626381 discloses an illumination device comprising a plurality of optical fibres, ordinarily of elliptical or rectangular cross-section, in which the cladding of the fibre is stripped at periodic intervals to expose the fibre core. Light is leaked through the exposed regions of the fibre since the critical angle for internal reflection is changed at those points with regard to the clad portion and any light rays exceeding that angle can escape from the fibre. The light is emitted from the fibre at a very shallow angle and is non-directed.

Japanese Utility Model Registration Nos. 62-9205 and 62-9206 disclose an illumination device comprising a ribbon of optical fibres arranged in a planar, parallel array. One surface of the ribbon is roughened by hot stamping with emery paper to form a series of interruptions in the cladding of each fibre which allow propagated light to leak from the ribbon. The interruptions are confined to the cladding and do not extend into the fibre core. Their pattern and spacing is essentially random being determined by the abrasive grit of the emery paper. The morphology of each individual interruption is similarly uncontrolled. The stamping apparatus is disclosed in U.S. Pat. No. 4,929,169 and is designed to apply an increasingly greater pressure to those areas of the ribbon intended to be remote from the light source to maintain a uniform output illumination along the length of the ribbon.

Japanese Patent Publication No. 63-121002 discloses cutting the end face of an optical fibre at an oblique angle to the fibre axis such that light propagated through the fibre and incident thereon is reflected in a direction substantially transverse to the fibre axis. Light emission is increased by roughening the surface of the end face of the fibre.

U.S. Pat. No. 4,743,410 discloses an illumination device comprising a plurality of light guide channels in the form of transparent rods set in a hardened resin matrix. The resin surrounds the rods on three sides, leaving one side of each rod exposed. The device is produced by a complicated casting procedure in which a plurality of spaced, parallel rods are formed on one side of a transparent base, e.g., by pressing or stamping techniques, and a casting resin applied over and between the rods, once the casting compound has hardened, then material is eroded from the side opposite that carrying the rods until only the rods, each surrounded on three sides by the casting resin, remain. The device is, by its very nature, substantially inflexible, thereby limiting its potential applications.

Each rod is optionally preformed with a plurality of depressions or notches shaped so as to reflect propagated light impinging thereon in a direction substantially perpendicular to the axis of the rods and through the exposed surface. A uniform output illumination along individual light guide channels is achieved by increasing the depth (cross-section) of the notches in the direction of intended light travel. In order to minimize unwanted light scattering effects, the notched surface of the rods is ordinarily silvered prior to coating with the casting resin.

Various types of light-diffusing panel are known which receive light from a source and provide a plane of light for the uniform illumination of signboards and other relatively large surface area displays, as well as articles incorporating liquid crystal displays. Such panels ordinarily comprise a sheet of a transparent material provided with a light-diffusing or light-reflecting surface or layer which directs light introduced through one end of the panel to exit from the panel in the desired direction. Examples of these light-diffusing panels are disclosed in U.S. Pat. Nos. 4,059,916; 4,642,736 and 4,648,690, and Japanese Patent Nos. 60-26001; 60-26002; 61-55684 and 61-104490.

U.S. Pat. No. 4,285,889 discloses a light-diffusing panel in which the rear surface of the panel is provided with a plurality of shallow depressions which are shaped so as to reflect propagated light impinging thereon out of the panel onto a display surface adjacent and coextensive with the rear surface of the panel. The depressions may be regularly or randomly spaced. The reflected light emerges away from the viewer who observes the display surface through the front of the panel. The diffusing surface is fabricated by roughening the rear surface of the panel to form relatively deep depressions which are then partially filled with an optically transparent material.

U.S. Pat. No. 4,729,068 discloses a multilaminate light-diffusing panel comprising a transparent light-transmitting base, a light-diffusing layer formed on the front surface of the base and, on the rear surface of the base, a light-reflecting layer effective for evenly distributing light propagated through the base to the light-diffusing layer. The light-reflecting layer ordinarily comprises a transparent film having formed therein a plurality of 'light-reflecting spots' the size, configuration and distribution of the spots being selected so as to produce a uniform output illumination. The light-reflecting spots are typically formed by selective etching of a layer of a light-reflecting metal.

The present invention seeks to provide optical fibres capable of selectively emitting light which find particular utility in the construction of illumination devices.

According to the present invention there is provided an optical fibre having a light emitting region along at least a portion of its length, the light emitting region Comprising a plurality of optical elements spaced along the fibre, the optical elements comprising at least one reflecting surface arranged such that a portion of light propagated through the fibre and impinging upon the surface(s) of an optical element is reflected across the fibre and through the wall of the light emitting region.

The term "optical fibre" as used herein is intended to encompass both clad and unclad fibres. The term "clad fibre" is used to describe a fibre which consists of a core having a coating of a cladding material having a lower refractive index than the core material. The term "unclad fibre" is used to describe a fibre which consists solely of the 'naked' core. Both clad and unclad fibres are suitable for use in the present invention.

The term "optical element" is used herein to encompass any controlled interruption or discontinuity formed in the core of the optical fibre, which defines one or more surfaces capable of reflecting at least a portion of light impinging thereon through the opposing wall of the fibre. Such optical elements are to be distinguished from scratches and other interruptions, as well as imperfections and other surface irregularities, which occur from time to time in optical fibres because they are formed in a controlled manner, with the morphology, pattern and spacing of the elements being tailored to suit the intended use of the fibre. By appropriate control of the morphology of each optical element, e.g., the angle, curvature and cross-sectional area of the reflecting surface(s), as well as the pattern and spacing of the elements along the fibre, light can be selectively emitted through the side wall of the fibre.

The reflecting surface(s) of each optical element is ordinarily inclined at an angle to a plane normal to the longitudinal axis of the fibre. Generally, the reflecting surface(s) is inclined at an angle of from 10° to 80°, preferably 20° to 70° and more preferably 30° to 60° to that plane, although substantially any useful angle between $\geq 0°$ and $<90°$ may be used.

The reflecting surface(s) of each optical element may be curved, but ordinarily it is substantially planar.

The reflecting surface(s) of the optical element is normally fabricated so as to be of optical quality. "Optical quality" is commonly understood to imply that the surface in question diffusely scatters only a small amount (generally less than 20%, preferably less than 15% and more preferably less than 10%) of the light incident upon it, the remainder being subject to specular reflection or refraction.

The optical elements are ordinarily fabricated such that at least 50%, preferably at least 80% and more preferably at least 90% of the light reflected from the surface(s) of an optical element is reflected across the fibre and through the wall of the light emitting region of the fibre.

Preferably, at least 50% of the total light emerging from the light emitting region of the fibre is reflected out of the fibre by the reflecting surfaces of the optical elements. More preferably, at least 80% of the total light emerging from the light emitting region of the optical fibre is reflected out of the fibre by the reflecting surfaces of the optical elements.

The reflecting surface(s) of the optical elements may optionally be treated so as to increase its reflectivity using any of the appropriate techniques known in the art, e.g., silvering.

The reflecting surface(s) of each optical element ordinarily extends transverse to the longitudinal axis of the fibre, although it may also be formed at an angle thereto.

The optical elements are ordinarily spaced along the centreline of the fibre, although any useful pattern of optical elements which is appropriate for the intended use of the fibre may be adopted.

In order to maintain a substantially uniform output illumination along the light emitting region of the fibre, the morphology, pattern and spacing of successive optical elements may be controlled so as to compensate for the light reflected out of the fibre by preceding elements. For example, the cross-sectional area of the reflecting surface(s) of successive optical elements may be increased in the direction of intended light travel. Alternatively, the spacing between successive optical elements may be decreased or the angle of the reflecting surface(s) changed, or a combination of any or all of these methods may be used.

The optical elements may be produced by any desirable means for forming an interruption or discontinuity in the fibre in a controlled manner, including, but not limited to: stamping, embossing or otherwise indenting the fibre, cutting or slitting the fibre, cracking the fibre etc. Where the fibre is provided with a coating of a cladding material, the interruption must extend through the cladding into the core of the fibre.

A preferred method of forming the optical elements involves notching the surface of the fibre by a stamping or embossing process. Each notch generally defines a first reflecting surface, together with a second surface which may be normal to the longitudinal axis of the fibre or inclined to or away from the plane normal to the longitudinal axis of the fibre. "Composite" notches comprising two or more reflecting surfaces are also useful.

The optical elements are preferably fabricated such that less than 20%, more preferably less than 10% and most preferably less than 5% of the total light transmitted through the fibre is able to escape directly through the interruption provided in the fibre by the optical elements.

Optical fibres in accordance with the invention find particular utility as a means of illumination and according to a further aspect of the present invention there is provided an illumination device comprising one or more such optical fibres.

For example, an array of such fibres may be used as backlights for instrumentation, displays and graphical images, or as a light source for overhead projectors, image scanners, optical printers, photocopiers, facsimile machines, televisions etc. In these applications, the morphology and spacing of the optical elements would normally be controlled so as to result in a substantially uniform light output, ordinarily perpendicular to the longitudinal axis of the fibre.

The illumination devices of the invention may also be used for a multitude of sign applications, including traffic and other road signs; pavement and road markings, bill boards and other advertisement hoardings, including those borne by vehicles, etc. In these applications, the fibres may be used singly or in groups to achieve different effects, such as a change in the displayed message or a change in colour, with the morphology, spacing and pattern of the optical elements controlled to produce the desired image and its projection to the necessary position relative to the sign.

The optical fibres of the invention find particular utility in strip and panel lighting.

The illumination devices of the invention generally comprise a panel and one or more optical fibres arranged such that at least a portion of the light transmitted through the wall of the fibre(s) is directed onto or through the panel.

In one embodiment, the panel may be formed of a transparent or semi-transparent material, such as an inorganic glass or synthetic resin. The panel may include a diffuser, polariser, filter, magnifying lens or other "optically active" element which modifies the direction, quantity or quality, e.g., the colour, of the light reflected out of the fibre(s).

The panel while not essential also serves to protect the fibre(s) from dust, dirt and other extraneous matter, mechanical damage and, when the device is placed at an exterior location, the weather. Such an arrangement finds particular utility in panel and strip lighting, road and pavement markings etc.

In another embodiment, the panel may comprise a liquid crystal shutter which modulates the light emitted from the fibre(s). Such shutters generally comprise two sheets of an inorganic glass or a synthetic resin separated by a "sealed-in" liquid crystal material. The inner surface of both sheets is provided with a thin transparent coating of a conductive material. When a voltage is applied between the two coatings, the orientation of the molecules of the liquid crystal material is changed to permit (or prevent) the passage of light through the shutter.

In a further embodiment, the panel may comprise a screen onto which the light from the fibre(s) in directed to display an image. Such an arrangement finds particular utility in traffic and road signs, bill boards and advertisement hoardings etc.

The panel may advantageously support the optical fibres in the desired configuration, the fibres being secured to the panel, e.g., by an adhesive.

The device generally comprises a light source positioned at one or both ends of the optical fibre(s) so as to transmit light therethrough. The light source may comprise any suitable light source, including both continuous and pulsed light sources, such as laser scanners, laser diodes, lamp bulbs etc., emitting in the UV, visible or infra-red.

In one preferred embodiment, the illumination device comprises a plurality of optical fibres arranged in a parallel, ordinarily, planar, array. Such an arrangement finds particular utility in panel and strip lighting.

The device may comprise two or more such arrays stacked one on top of the other in a layered arrangement, with the arrays attached to each other and the panel. The notches on any particular layer are usually formed on the side of the array remote from the panel, but it is not necessary for the notches in one layer to line up with those on the next, and indeed it may be preferable that they do not, in order to achieve a more uniform output illumination. Of course, two arrays may be used in a 'back-to-back' arrangement.

Where the fibres making up the array are compensated to provide a constant output illumination along the length of the array, e.g., by decreasing the distance between successive optical elements in the direction of light travel, the light source is normally provided at one end of the array, with each fibre oriented accordingly. However, where the fibre is compensated for the leakage of light from preceding elements in both directions, e.g., by decreasing the distance between successive optical elements from either end until the mid-point of the light emitting region is reached, a light source should be provided at both ends of the array.

Fibres illuminated from one end may advantageously have a reflective surface deposited on the other end.

The device may advantageously include a cover shaped so as to be secured about at least the periphery of the panel to enclose the fibres. The cover may be formed of a reflective material or coated with a separate layer of such material to reflect any 'wrong way' light rays emitted from the fibre(s). The term "cover" is used herein in its broadest sense and may encompass, e.g., a coating of a metal which may be vapor deposited onto the surface of the fibre(s). The surfaces of the notch may themselves be coated with the metal to prevent the leakage of 'wrong-way' light rays.

The advantages of such illumination devices are numerous and include:

(1) they are capable of providing a bright light source of (practically) unrestricted size;

(2) they are cool running utilizing a remote light source with little transmission of heat;

(3) they have a relatively simple construction, are easy to maintain, have a relatively light weight and low bulk and are flexible;

(4) the ability to change the image displayed;

(5) selectable uniformity of illumination;

(6) they are thin, and (7) they are capable of providing a directed light output.

The present invention will now be described by way of example with reference to the accompanying drawings, in which:

FIGS. 3a to 3c are sectional views through further embodiments of optical fibre in accordance with the invention;

FIGS. 4a and 4b are plan views of further embodiments of optical fibre in accordance with the invention;

FIGS. 5a and 5b are sectional views of further embodiments of optical fibre in accordance the invention;

FIG. 6a is a side view of an optical fibre in accordance with the invention;

FIG. 6b is a sectional view along the line A—A of the optical fibre of FIG. 6a;

FIG. 7 is a side view of another embodiment of optical fibre in accordance with the invention.

Figure 1:
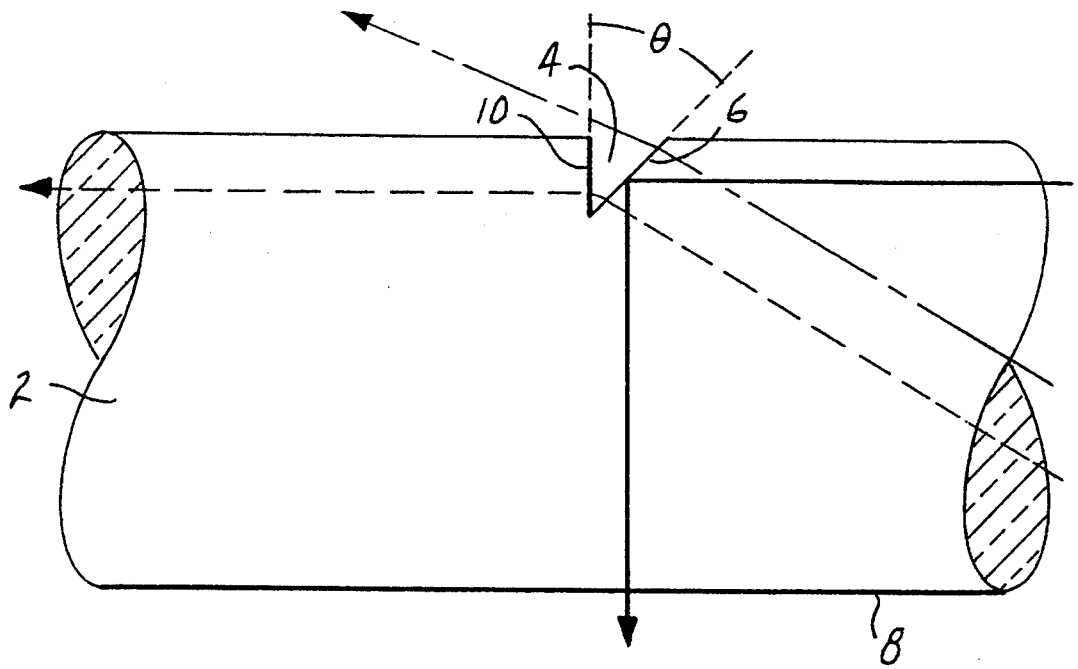
FIG. 1 is a side view of a portion of an optical fibre in accordance with the invention.

FIG. 1 depicts one portion of an optical fibre (2) in accordance with the invention. The fibre (2) is provided with, at defined intervals, a plurality of optical elements, in this embodiment in the form of a series of notches (4), only one of which is shown. Each notch (4) extends through the fibre cladding (where present) into the core material and defines a first surface (6), inclined at an angle to a plane normal to the longitudinal axis of the fibre, which acts as a reflection mirror such that a portion (exemplified by the solid arrow) of the light propagated through the fibre (2) and impinging upon the surface (6) is reflected through the opposing wall (8) of the fibre (2). Each notch (4) also defines a second surface (10), in this embodiment substantially normal to the axis of the fibre (2).

Assuming the inclined surface (6) has not been silvered or otherwise rendered totally reflective, light striking the surface (6) at an angle less than the critical angle of reflection of the core-to-air interface is reflected across the fibre (2) to strike the opposing wall (8). If the angle of incidence of the reflected light on the wall (8) is greater than the critical angle of reflection for this interface, then the light emerges through the wall (8), as exemplified by the solid arrow. If the angle of incidence of the reflected light on the wall (8) is less than the critical angle, then the light continues to propagate within the fibre (2).

Light striking the inclined surface (6) at an angle greater than 'the critical angle of reflection may pass through the surface (6) (with refraction) and either escape from the fibre (2) or strike the second surface (10), as exemplified by the broken arrows, depending on the angles involved. Light striking the second surface (10) is either refracted back into the fibre (2) or reflected out of the fibre (2), again depending on the angle of incidence. By suitable design of the notch geometry, the proportion of light escaping via the notch may be minimized, and the proportion reflected onto the opposing wall (8) maximized. If the reflectivity of surface (6) is enhanced (e.g., by silvering), then a greater proportion of the light striking surface (6) will be reflected onto wall (8).

The net effect of the notch (4) is therefore to divert a fixed proportion of the total light propagating through the fibre (2) out through wall (8), with a much smaller proportion escaping through the notch (4) itself. The remaining light continues to propagate within the fibre (2), where it may impinge upon successive notches (not shown), and at each notch, a further proportion of the light is diverted out through wall (8) in accordance with the principles outlined above.

It will be appreciated that the morphology of each notch (4), for example: the angle of inclination of the first (6) and, to a lesser extent, the second surface (10); whether each surface (6 and 10) is planar or curved; the cross-sectional area of each surface (6 and 10) etc., will influence the amount and direction of light emitted from the fibre (2) at that particular emission point. Consequently, the amount and direction of the light reflected from the fibre can be controlled by selecting the appropriate notch type, as well as the pattern and spacing of the notches along the fibre. Although each notch on a given fibre would ordinarily be of similar morphology, any useful combination of notch types may be employed (see also the commentary hereinafter regarding maintaining a constant output illumination along the length of the fibre).

In the embodiment shown, the first surface (6) of the notch (4) is inclined at an angle of approximately 45° to the aforesaid plane, though angles of from 10° to 80°, preferably from 20° to 70° and more preferably from 30° to 60°, are also useful depending on the desired amount and direction of travel of the light exiting from the fibre, any useful angle of from $0 \leq O < 90°$ may be used.

Figure 2A:
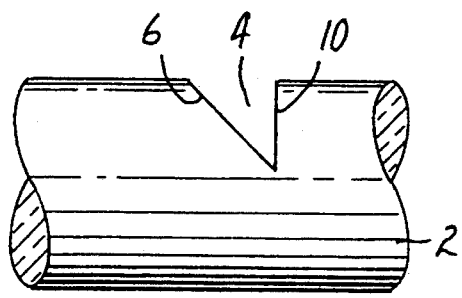
FIGS. 2a to 2d are side views of further embodiments of optical fibre in accordance with the invention.
Figure 2B:
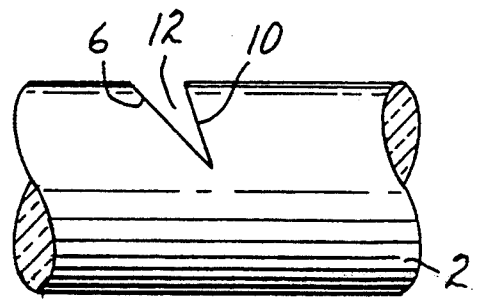
Figure 2C:
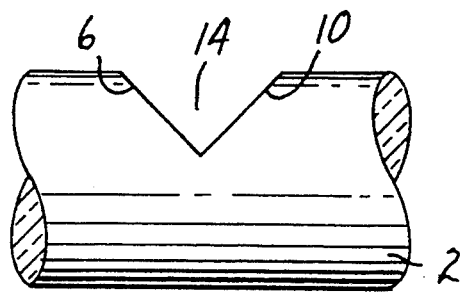

The second surface (10) of the notch (4) may be normal to the longitudinal axis of the fibre (2), as shown in FIG. 2a, or inclined to or away from a plane normal to the longitudinal axis of the fibre (2), as shown in FIGS. 2b and 2c, to define a 'V' shaped or undercut notch (14 and 12 respectively).

Figure 2D:
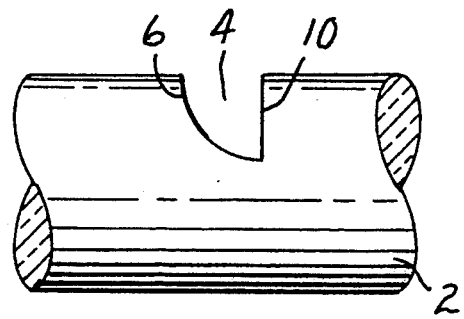

One or both surfaces (6 and 10) of the notch (4) may for certain uses be curved, as shown in FIG. 2d, but ordinarily they are substantially planar. The surfaces of the notch are normally fabricated so as to be of optical quality.

FIGS. 3a to 3c illustrate schematically the wide variation in notch morphology that can be used to control the amount and direction of light emitted from the fibre at a given emission point.

One or both surfaces (6 and 10) of the notch (4) may optionally be treated so as to increase its reflectivity using any of the appropriate techniques known in the art.

The notches (4) may extend transverse to the longitudinal axis of the fibre (2), as shown in FIG. 4a, or they may be canted at angle thereto, as shown in FIG. 4b.

The fibre itself may comprise any suitable optical fibre known to the art, including both inorganic glass and synthetic resin fibres, although core materials having a refractive index of from 1.4 to 1.66 are generally preferred, and notches are more easily fashioned in plastics fibres. The cladding (where present) may comprise any suitable material known in the art having a refractive index appropriate for the chosen core material.

Whilst the fibre may have any useful cross-sectional shape, the majority of commercially available fibres are of circular, rectangular (square) or elliptical cross-section (see FIGS. 5a and 5b). However, in order to ensure an even distribution of light throughout the fibre its cross-section should be substantially uniform over at least the light emitting (notched) region of the fibre. The choice of fibre cross-section may depend on a number of factors ranging from the mundane, such as the fact that rectangular fibres can be more readily packed in a parallel array, to the complex, such as the characteristic distribution of light propagating through the fibre of a particular cross-section. For example, it is known that for a fibre of elliptical cross-section, the propagated light becomes concentrated along the major axes of the ellipse.

The dimensions of the fibres will also vary with their intended use. For example, for strip lighting purposes, fibre lengths of up to 50, or even 100 m, may be used. Generally, for fibres of circular cross-section, the diameter of the fibre may vary from 5 gm to 5 mm, although diameters outside this range may also be useful.

FIG. 6 is a side view of another embodiment of optical fibre (16) in accordance with the invention. The fibre (16) is provided with a plurality of 'V' shaped notches (14) spaced at periodic intervals along the centre line of the fibre (16), although any useful pattern of notches (14) which is appropriate for the intended use of the fibre (16) may be adopted. Each notch (14) defines first and second surfaces (6 and 10 respectively) inclined at an angle of about 45° to the longitudinal axis of the fibre (16). In order to maintain a substantially uniform output light intensity along the light emitting (notched) region of the optical fibre, the spacing between successive notches is decreased in the direction of intended light travel (indicated by the dotted arrow). Although the light emitted from each successive notch decreases as a result of the leakage of light from preceding notches, this is compensated by increasing the notch density in the direction of light travel. This is shown in a somewhat exaggerated fashion. Alternatively, the angle of inclination of the surface(s) may be changed or, as shown in FIG. 7, the cross-sectional area of each surface (6 and 10) of successive notches (4) may be increased in the direction of intended light travel, so as to compensate for the aforesaid light loss.

Referring to FIG. 6a, the spacing between successive notches can be defined by formula (I):

$$S = K\left[1 - \frac{A}{C}\right]^n \quad (I)$$

in which;
S=distance between successive notches, i.e., the $n^{th}$ and the $n+1^{th}$ notches;
n=the number of each individual notch;
K=a constant (referred to herein as "the notch spacing constant");
C=cross-sectional area of the fibre, and
A=cross-sectional area of the notch.

Referring to FIG. 6b, the cross-sectional area of the notch (12) for a fibre (16) of circular cross-section can be determined by formula (II):

$$A = \frac{\pi r^2}{180} \arccos\left[\frac{r-d}{r}\right] - [(r-d) \cdot (\sqrt{2rd - d^2})] \quad (II)$$

in which;
A=cross-sectional area of the notch;
d=maximum depth of notch, and
r=radius of optical fibre.

The length of the notched surface (T) may be determined by formula (III):

$$T = \sum_{1}^{N-1} K\left[1 - \frac{A}{C}\right]^n = \quad (III)$$

$$K\left[\frac{(1 - A/C) \cdot (1 - (1 - A/C)^{N-1})}{A/C}\right]$$

in which;
N=total number of notches;
n=number of each individual notch;
K=notch spacing constant;
C=cross-sectional area of the fibre; and
A=cross-sectional area of the notch.

Thus, by way of example the data for a fibre of circular cross-section having a diameter of 1.0 mm and 175 notches of constant morphology would be as follows:

| | | |
|---|---|---|
| (i) Fiber radius (r) = | | 0.5 mm |
| (ii) Notch depth (d) = | | 0.0375 mm |
| (iii) Length of notched surface (T) = | | 150 mm |
| (iv) Cross-sectional area of notch (A) = | | 0.009573 mm |
| (v) Cross-sectional area of fiber (C) = | | 0.7854 mm |
| (vi) Notch spacing constant (K) = | | 2.0994 mm |
| (vii) Distance between first and second notches (S where n = 1) = | | 2.074 mm |
| (viii) Distance between 174th and 175th notches (S where n = 174) = | | 0.246 mm |
| (ix) Distance between successive notches from first notch (mm) = | | |

| Notch | Distance | Notch | Distance | Notch | Distance |
|---|---|---|---|---|---|
| 2 | 2.07 | 3 | 4.12 | 4 | 6.15 |
| 5 | 8.14 | 6 | 10.12 | 7 | 12.07 |
| 8 | 14.00 | 9 | 15.90 | 10 | 17.78 |
| 11 | 19.63 | 12 | 21.47 | 13 | 23.28 |
| 14 | 25.07 | 15 | 26.84 | 16 | 28.59 |
| 17 | 30.31 | 18 | 32.02 | 19 | 33.70 |
| 20 | 35.36 | 21 | 37.01 | 22 | 38.63 |
| 23 | 40.23 | 24 | 41.82 | 25 | 43.38 |
| 26 | 44.92 | 27 | 46.45 | 28 | 47.96 |
| 29 | 49.45 | 30 | 50.92 | 31 | 52.37 |
| 32 | 53.81 | 33 | 55.23 | 34 | 56.63 |
| 35 | 58.01 | 36 | 59.38 | 37 | 60.73 |
| 38 | 62.06 | 39 | 63.38 | 40 | 64.68 |
| 41 | 65.96 | 42 | 67.23 | 43 | 68.49 |
| 44 | 69.73 | 45 | 70.95 | 46 | 72.16 |
| 47 | 73.35 | 48 | 74.53 | 49 | 75.70 |
| 50 | 76.85 | 51 | 77.99 | 52 | 79.11 |
| 53 | 80.22 | 54 | 81.32 | 55 | 82.40 |
| 56 | 83.47 | 57 | 84.52 | 58 | 85.57 |
| 59 | 86.60 | 60 | 87.62 | 61 | 88.62 |
| 62 | 89.62 | 63 | 90.60 | 64 | 91.57 |
| 65 | 92.53 | 66 | 93.47 | 67 | 94.41 |
| 68 | 95.33 | 69 | 96.24 | 70 | 97.14 |
| 71 | 98.03 | 72 | 98.91 | 73 | 99.78 |
| 74 | 100.64 | 75 | 101.48 | 76 | 102.32 |
| 77 | 103.15 | 78 | 103.96 | 79 | 104.77 |
| 80 | 105.57 | 81 | 106.35 | 82 | 107.13 |
| 83 | 107.90 | 84 | 108.66 | 85 | 109.41 |
| 86 | 110.15 | 87 | 110.88 | 88 | 111.60 |
| 89 | 112.31 | 90 | 113.02 | 91 | 113.72 |
| 92 | 114.40 | 93 | 115.08 | 94 | 115.75 |
| 95 | 116.42 | 96 | 117.07 | 97 | 117.72 |
| 98 | 118.36 | 99 | 118.99 | 100 | 119.61 |
| 101 | 120.23 | 102 | 120.84 | 103 | 121.44 |
| 104 | 122.03 | 105 | 122.62 | 106 | 123.20 |
| 107 | 123.77 | 108 | 124.33 | 109 | 124.89 |
| 110 | 125.44 | 111 | 125.99 | 112 | 126.53 |
| 113 | 127.06 | 114 | 127.58 | 115 | 128.10 |
| 116 | 128.61 | 117 | 129.12 | 118 | 129.62 |
| 119 | 130.11 | 120 | 130.60 | 121 | 131.08 |
| 122 | 131.56 | 123 | 132.03 | 124 | 132.50 |
| 125 | 132.95 | 126 | 133.41 | 127 | 133.86 |
| 128 | 134.30 | 129 | 134.73 | 130 | 135.17 |
| 131 | 135.59 | 132 | 136.01 | 133 | 136.43 |
| 134 | 136.84 | 135 | 137.25 | 136 | 137.65 |
| 137 | 138.04 | 138 | 138.43 | 139 | 138.82 |

-continued

| | | | | | |
|---|---|---|---|---|---|
| 140 | 139.20 | 141 | 139.58 | 142 | 139.95 |
| 143 | 140.32 | 144 | 140.68 | 145 | 141.04 |
| 146 | 141.40 | 147 | 141.75 | 148 | 142.09 |
| 149 | 142.44 | 150 | 142.77 | 151 | 143.11 |
| 152 | 143.44 | 153 | 143.76 | 154 | 144.08 |
| 155 | 144.40 | 156 | 144.71 | 157 | 145.02 |
| 158 | 145.33 | 159 | 145.63 | 160 | 145.93 |
| 161 | 146.23 | 162 | 146.52 | 163 | 146.8 |
| 164 | 147.09 | 165 | 147.37 | 166 | 147.65 |
| 167 | 147.92 | 168 | 148.19 | 169 | 148.46 |
| 170 | 148.73 | 171 | 148.99 | 172 | 149.25 |
| 173 | 149.50 | 174 | 149.75 | 175 | 150.00 |

Figure 8:
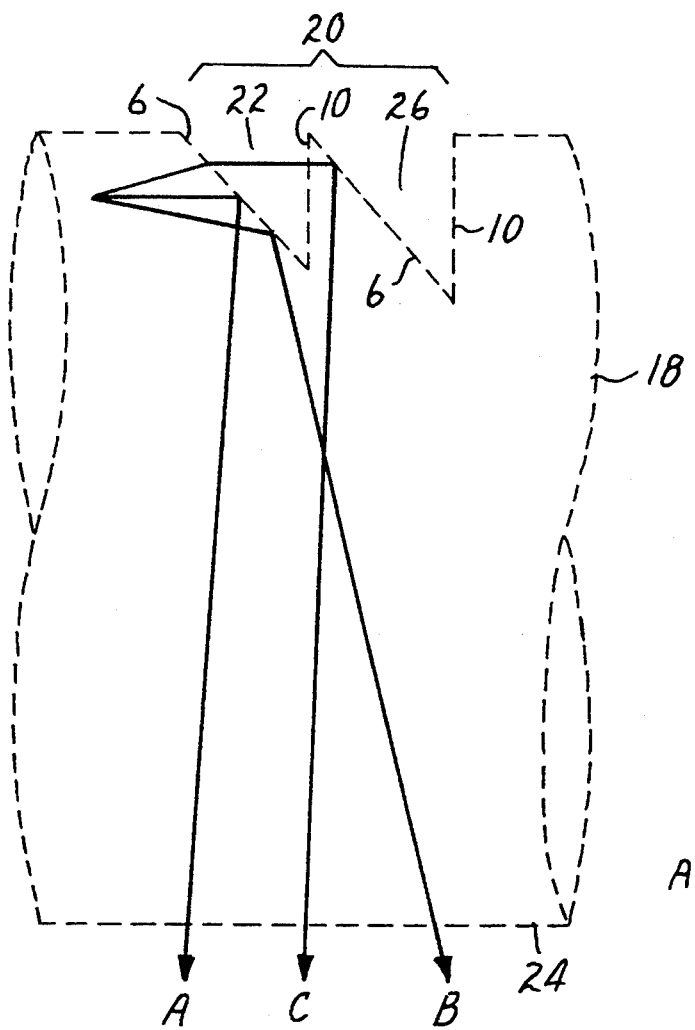
FIG. 8 is a schematic representation of another embodiment of optical fibre in accordance with the invention.

FIG. 8 depicts an optical fibre (18) provided with a "composite" notch (20), that is, comprising two or more notches which are not spaced apart, at each emission point along the length of the fibre (18). Light incident on the first surface (4) of the first notch (22) at angles 9 critical angle is reflected across the fibre (18) and through the opposing wall (24), as indicated by solid arrows 'A' and 'B'. Light incident at angles greater than the critical angle is refracted through the second surface (26) of the notch (22) whereupon it may be reelected from the first surface (4) of the second notch (26) across the fibre (18) and through the side wall (24), as indicated by solid arrow 'C'.

Figure 9:
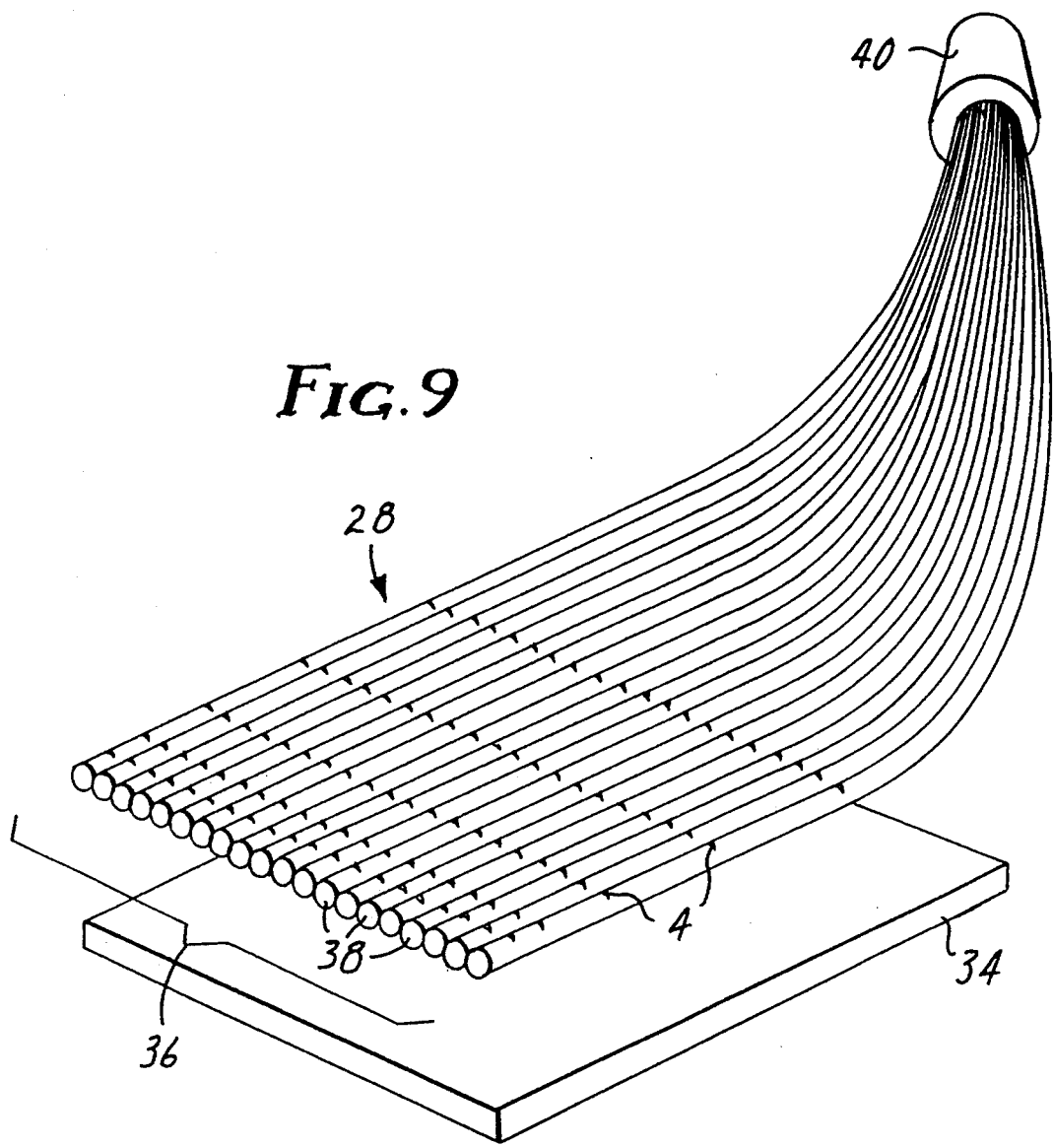
FIG. 9 is a perspective view of a preferred embodiment of illumination device in accordance with the invention.

FIG. 9 depicts a preferred embodiment of an illumination device in accordance with the invention. The device (indicated generally by (28)) comprises a front panel (34), ordinarily comprising a sheet of an at least semi-transparent (e.g., diffusing) material, and a substantially parallel array (36) of optical fibres (38) in abutting side-by-side relationship. The array (36) of optical fibres (38) may be secured to the front panel (34), e.g., using a suitable transparent adhesive. Where the optical fibre is of the unclad variety, the adhesive may advantageously have a refractive index ($n_D$) lower than that of the core material of the fibre, generally at least 0.03 units lower and preferably at least 0.05 units lower, to reduce unwanted light scattering effect.

The front panel (34) may be formed of any suitable material possessing sufficient transparency to allow the passage therethrough of light emitted from the array (36) of optical fibres (38), including both inorganic glasses and synthetic resins. The optical properties of the front panel may be chosen so as to influence the direction, quantity or quality, e.g., colour, of the light emerging from the device (32). For example, the panel may be marked with diffusion plates or collimating lenslets.

The device may optionally include a cover (not shown) which serves to protect the rear surfaces of the fibres from mechanical damage and the notches from contamination by dirt, dust and other extraneous matter.

The cover is advantageously formed from a reflective material or coated thereon with a layer of such material so as to reflect 'wrong way' light rays in the direction of the front panel. The cover panel is secured about at least the periphery of the front panel using a suitable adhesive or other fastening means. Where the fibres are of the unclad variety, the cover is preferably secured to the front panel so as to leave the notches filled with air (as a low refractive index material). Alternatively, if a low $n_D$ adhesive is used to secure the rear panel in position, the notches may be filled with the adhesive, but this is not preferred.

In the embodiment shown, both the front panel (34) and the array (36) of optical fibres (38) are substantially planar, but any practical configuration may adopted.

Figure 9A:
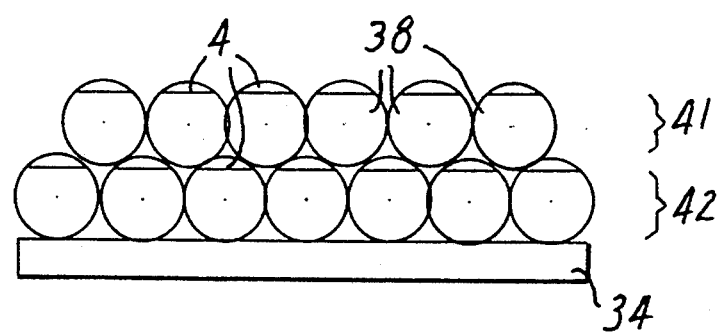
FIG. 9a is an end view of an alternative embodiment of illumination device in accordance with the invention.

In a further embodiment, the device may comprise two or more such arrays of fibres stacked one on top of the other in a layered arrangement, and attached to each other and to the front panel, e.g., by a suitable adhesive. Referring to FIG. 9a, if the fibres are of circular cross-section, a staggered (close packed) arrangement of adjacent layers (41 and 42) is preferred. The notches (4) on any particular layer must be on the side of the layer (41 and 42) that is remote from the front panel (34), but it is not necessary for the notches in any one layer to line up with those on the next, and indeed it may be preferable that they do not, in order to achieve a more uniform output. Devices of this type provide a higher intensity of illumination with only a small sacrifice in terms of overall thickness.

The device is ordinarily provided with a light source(s) (not shown) which may be positioned at one or both ends of the array of fibres so as to transmit light therethrough. If the notch patterns of individual fibres of the array are each oriented in one direction, as shown in FIG. 9, the light source is ordinarily positioned at one end of the array. However, for other notch patterns, the light source may be positioned at both ends.

The free ends of the optical fibres (38) are conveniently pigtailed (40), as shown in FIG. 9, to group them in a bundle. A bundle of fibres is more easily illuminated than a parallel array. The light source for the device may advantageously be located at a position remote from the light emitting (notched) region of the fibre array. For example, if the device were to be used as an interior light for a motor vehicle, the light source could be located in the boot (trunk) of the vehicle to allow the owner easy access to replace the bulb. A number of devices can be conveniently illuminated by a single light source.

Figure 10:
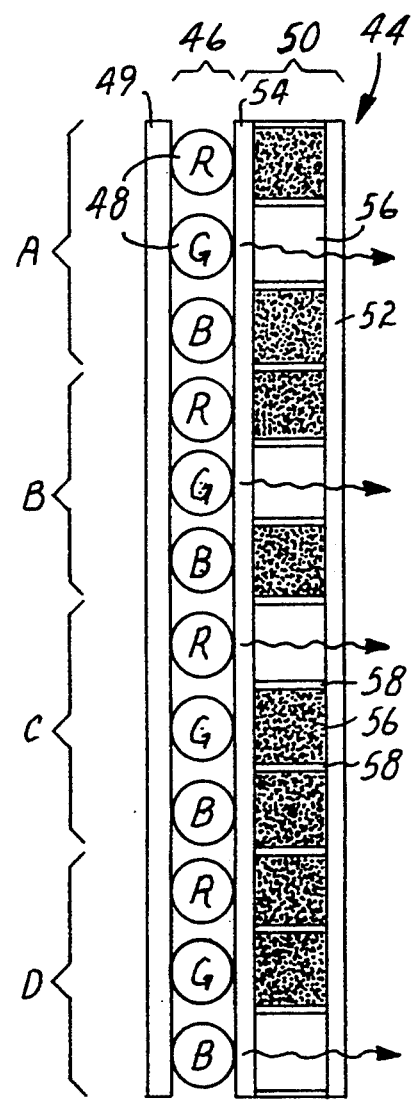
FIG. 10 is a schematic representation of another preferred embodiment of illumination device in accordance with the invention.

FIG. 10 illustrates a further embodiment of illumination device. (indicated generally by (44)) in accordance with the invention. The device (44) comprises a substantially parallel array (46) of optical fibres (48) and a front panel in the form of a liquid crystal shutter array (LCS) (50). The device (44) also comprises a rear panel (49).

The liquid crystal shutter array (50) comprises two transparent sheets (52 and 54), e.g., of an inorganic glass or a synthetic resin, separated by layer of a liquid crystal material divided into discrete areas or 'shutters' (56) by spacers (58) to correspond to individual fibres (48) in the array (46). The inner surface of both sheets (52 and 54) is provided with a transparent coating (not shown) of a conductive material, likewise divided into discrete portions which correspond to each liquid crystal shutter (56). When a voltage is applied between the two coatings, the orientation of the liquid crystal material is charged to permit (or prevent) the passage therethrough of light. The general principles of the construction and mode of operation of liquid crystal shutter arrays are well known in the art.

Red light is transmitted through the first fibre of every three, green light the second and blue light the third. The colour of the light propagating through each fibre is indicated by the letters 'R' (red), 'G' (green) and 'B' (blue) respectively.

It will be appreciated that each group of three fibres and their corresponding shutter can define a 'pixel' on an imaging screen. Four such pixels, denoted by A to D are illustrated in FIG. 10 emitting green (A), green (B), red (C) and blue (D) light respectively. By appropriate manipulation of the shutter arrays, it is possible to mix the primary colours to produce secondary colours and hence build up a full colour image. Such an arrangement finds particular utility in, e.g., a thin LCS based colour televisions, as unlike commercially available systems the imaging light only passes through a single LCS producing a bright picture.

The present invention will now be described with reference to the accompanying Examples, in which a stamping tool prepared according to the following specification was used to notch the optical fibres.

| Specification: | | |
|---|---|---|
| (a) Notch depth | | 0.0375 mm |
| (b) Total number of notches | | 175 |
| (c) Distance between first and last notch | | 150 mm |
| (d) Distance of successive notches from first notch (mm) | | |

| Notch | Distance | Notch | Distance | Notch | Distance |
|---|---|---|---|---|---|
| 2 | 2.07 | 3 | 4.12 | 4 | 6.15 |
| 5 | 8.14 | 6 | 10.12 | 7 | 12.07 |
| 8 | 14.00 | 9 | 15.90 | 10 | 17.78 |
| 11 | 19.63 | 12 | 21.47 | 13 | 23.28 |
| 14 | 25.07 | 15 | 26.84 | 16 | 28.59 |
| 17 | 30.31 | 18 | 32.02 | 19 | 33.70 |
| 20 | 35.36 | 21 | 37.01 | 22 | 38.63 |
| 23 | 40.23 | 24 | 41.82 | 25 | 43.38 |
| 26 | 44.92 | 27 | 46.45 | 28 | 47.96 |
| 29 | 49.45 | 30 | 50.92 | 31 | 52.37 |
| 32 | 53.81 | 33 | 55.23 | 34 | 56.63 |
| 35 | 58.01 | 36 | 59.38 | 37 | 60.73 |
| 38 | 62.06 | 39 | 63.38 | 40 | 64.68 |
| 41 | 65.96 | 42 | 67.23 | 43 | 68.49 |
| 44 | 69.73 | 45 | 70.95 | 46 | 72.16 |
| 47 | 73.35 | 48 | 74.53 | 49 | 75.70 |
| 50 | 76.85 | 51 | 77.99 | 52 | 79.11 |
| 53 | 80.22 | 54 | 81.32 | 55 | 82.40 |
| 56 | 83.47 | 57 | 84.52 | 58 | 85.57 |
| 59 | 86.60 | 60 | 87.62 | 61 | 88.62 |
| 62 | 89.62 | 63 | 90.60 | 64 | 91.57 |
| 65 | 92.53 | 66 | 93.47 | 67 | 94.41 |
| 68 | 95.33 | 69 | 96.24 | 70 | 97.14 |
| 71 | 98.03 | 72 | 98.91 | 73 | 99.78 |
| 74 | 100.64 | 75 | 101.48 | 76 | 102.32 |
| 77 | 103.15 | 78 | 103.96 | 79 | 104.77 |
| 80 | 105.57 | 81 | 106.35 | 82 | 107.13 |
| 83 | 107.90 | 84 | 108.66 | 85 | 109.41 |
| 86 | 110.15 | 87 | 110.88 | 88 | 111.60 |
| 89 | 112.31 | 90 | 113.02 | 91 | 113.72 |
| 92 | 114.40 | 93 | 115.08 | 94 | 115.75 |
| 95 | 116.42 | 96 | 117.07 | 97 | 117.72 |
| 98 | 118.36 | 99 | 118.99 | 100 | 119.61 |
| 101 | 120.23 | 102 | 120.84 | 103 | 121.44 |
| 104 | 122.03 | 105 | 122.62 | 106 | 123.20 |
| 107 | 123.77 | 108 | 124.33 | 109 | 124.89 |
| 110 | 125.44 | 111 | 125.99 | 112 | 126.53 |
| 113 | 127.06 | 114 | 127.58 | 115 | 128.10 |
| 116 | 128.61 | 117 | 129.12 | 118 | 129.62 |
| 119 | 130.11 | 120 | 130.60 | 121 | 131.08 |
| 122 | 131.56 | 123 | 132.03 | 124 | 132.50 |
| 125 | 132.95 | 126 | 133.41 | 127 | 133.86 |
| 128 | 134.30 | 129 | 134.73 | 130 | 135.17 |
| 131 | 135.59 | 132 | 136.01 | 133 | 136.43 |
| 134 | 136.84 | 135 | 137.25 | 136 | 137.65 |
| 137 | 138.04 | 138 | 138.43 | 139 | 138.82 |
| 140 | 139.20 | 141 | 139.58 | 142 | 139.95 |
| 143 | 140.32 | 144 | 140.68 | 145 | 141.04 |
| 146 | 141.40 | 147 | 141.75 | 148 | 142.09 |
| 149 | 142.44 | 150 | 142.77 | 151 | 143.11 |
| 152 | 143.44 | 153 | 143.76 | 154 | 144.08 |
| 155 | 144.40 | 156 | 144.71 | 157 | 145.02 |
| 158 | 145.33 | 159 | 145.63 | 160 | 145.93 |
| 161 | 146.23 | 162 | 146.52 | 163 | 146.81 |
| 164 | 147.09 | 165 | 147.37 | 166 | 147.65 |
| 167 | 147.92 | 168 | 148.19 | 169 | 148.46 |
| 170 | 148.73 | 171 | 148.99 | 172 | 149.25 |
| 173 | 149.50 | 174 | 149.75 | 175 | 150.00 |

The above specification defines a stamping tool for notching the optical fibres in such a manner as to give, at least theoretically, a uniform distribution of emitted light along the light emitting region of the fibre. This is achieved by decreasing the spacing between successive notches in the direction of light travel such that the light emitted from each successive notch is compensated by the density of notching of the fibre.

Figure 11A:
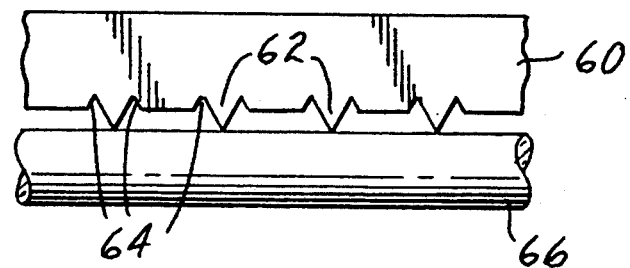
FIGS. 11a to 11c illustrate the method used to prepare the optical fibres used in the accompanying Examples.
Figure 11B:
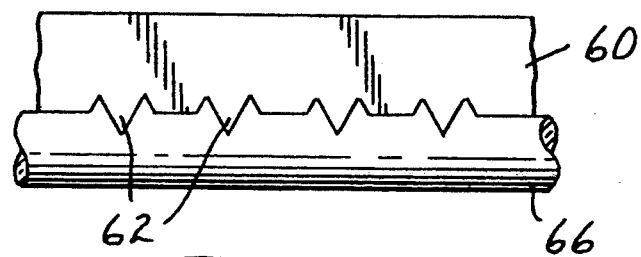
Figure 11C:
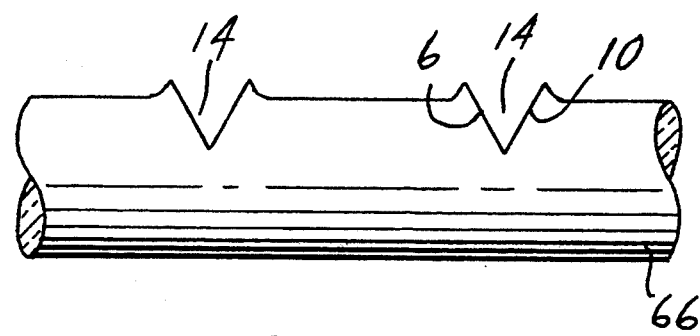

FIGS. 11a to 11c illustrate the stamping process used in the Examples to notch the fibres. The stamping tool (60) comprises a metal die, one surface of which has been machined, e.g., by electrodeposition or spark erosion techniques to provide a series of ridges (62) extending parallel to each other and flanked on either side by a groove (64). The stamping tool (60) is pressed down onto the fibre (66) and used to indent the surface of the fibre, as shown in FIG. 11b. The stamping operation is preferably conducted at elevated temperatures. The grooves (64) provided on either side of the ridges (62) receive the displaced cladding material, as shown in FIG. 11c.

EXAMPLE 1

An illumination device in accordance with the invention was assembled as follows. Sixty 1 meter poly(methymethacrylate) (PMMA) optical fibres (1.0 mm diameter), commercially available from Fibre Lightguides, were laid side-by-side on a flat surface and adhered together with a quick-setting epoxy adhesive applied at two points approximately 30 cm apart. A front panel comprising a poly(ethylene terephthalate) (PET) sheet (75 pm thick) was coated with an adhesive preparation (2:3 by weight mixture of CY1311 and ARALDITE fast cure hardener, both of which are commercially available from Ciba Geigy), to a thickness of 75 gm. The optical fibre array was then laid onto the adhesive film and held in place with a heavy weight. Once the adhesive had cured, the array was placed on a rubber mat, with the PET film facing downwards, and the stamping tool placed on the array. A force of 5082.5 kg pressure was applied to the tool for a period of 1 minute at 80° C., after which the pressure was released, and the tool removed from the array.

The data for the notches is as follows (see also the commentary on FIGS. 6a and 6b):

| | |
|---|---|
| (i) Notch depth = | 0.0375 mm |
| (ii) Length of notched surface = | 150 mm |
| (iii) Cross-sectional area of notch = | 0.009573 mm$^2$ |
| (iv) Distance between first and second notches = | 2.074 mm |
| (v) Distance between 174th and 175th notches = | 0.246 mm |

A rear panel comprising a PET sheet (75 μm thick) was placed on top of the notched fibres (to ensure that dust did not contaminate the notches), and secured to the array with adhesive tape.

The optical fibres were pigtailed, set in an acrylic potting compound and polished with glass paper to expose the fibre ends. The final polish was performed with 6 μm diamond grit. Chopped light from a 5 mW HeNe laser (633 nm) diverged to approximately 15 mm diameter by passage through an objective lens was injected into the polished end faces of the fibres and the intensity of the light from the front and rear panels of the device measured (using a silicon photodiode fed into a Stanford Research Systems lock-in amplifier) at 11 points on the display as indicated below. The results obtained are shown in TABLE 1 overleaf.

TABLE 1

| Measuring Point | Intensity of Output light | |
|---|---|---|
| | Front Panel | Rear Panel |
| 1 | 0.452 | 0.140 |
| 2 | 0.401 | 0.151 |
| 3 | 0.414 | 0.160 |
| 4 | 0.388 | 0.168 |
| 5 | 0.442 | 0.168 |
| 6 | 0.419 | 0.167 |
| 7 | 0.597 | 0.223 |
| 8 | 0.553 | 0.226 |
| 9 | 0.429 | — |
| 10 | 0.422 | — |
| 11 | 0.492 | — |

```
INJECT      1    3    5    7
    ───▶         9   10   11
            2    4    6    8
```

Represented graphically (arbitrary units):

```
INJECT     452  414  442  597
    ───▶        429  422  492      FRONT
           401  388  419  553

INJECT     142  160  168  223
    ───▶         -    -    -       REAR
           151  168  167  226
```

The results show that the majority of the light emitted by the fibres passes through the front panel.

EXAMPLE 2

Prior to potting and polishing the fibre ends of the array, transmission measurements were taken for a random sample of five optical fibres in the array. similar measurements were also taken on samples of unnotched optical fibres of the same (1 m) length, for use as a comparison against the notched fibres. The results obtained are shown in TABLE 2.

TABLE 2

| Characteristic | Notched | Unnotched |
|---|---|---|
| Mean loss (dB/m) | −13.11 | −4.89 |
| Transmitted power (mW) | 0.0489 | 0.3240 |
| Transmitted power (as percentage of unnotched fiber) | 15 | 100 |
| Power loss (%) | 85 | — |

EXAMPLE 3

An array was assembled and notched as described in Example 1, but using seventy 1.5 meter PMMA optical fibres (1.0 mm diameter), commercially available from Fibre Lightguides, and a sheet of aluminised PET as the rear panel to reflect any stray light in the forward direction. Light was injected into the device as described in Example 1 and the output light intensity measured at 15 points on the front panel of the device as indicated below. The results obtained are shown in TABLE 3 overleaf.

```
INJECT      1    4    7   10   13
    ───▶    2    5    8   11   14
            3    6    9   12   15
```

TABLE 3

| Measuring Point | Intensity of Output Light |
|---|---|
| 1 | 0.342 |
| 2 | 0.332 |
| 3 | 0.509 |
| 4 | 0.356 |
| 5 | 0.337 |
| 6 | 0.508 |
| 7 | 0.407 |
| 8 | 0.374 |
| 9 | 0.558 |
| 10 | 0.458 |
| 11 | 0.398 |
| 12 | 0.640 |
| 13 | 0.485 |
| 14 | 0.496 |
| 15 | 0.669 |

Represented graphically (arbitrary units:

```
INJECT     342  356  407  458  485
    ───▶   332  337  374  398  496
           509  508  558  640  669
```

EXAMPLE 4

An array was assembled and notched as described in Example 1, but using twenty five 1 meter PMMA optical fibres (obtained from Fibre Lightguides Ltd.) having a rectangular cross-section (2.0 mm × 1.5 mm) laid side-by-side with the short face exposed on the front and rear panels of the device. Light was injected into the device as described in Example 1 and the intensity of the output light measured at 18 points on the front panel of the device as indicated below. The results obtained are shown in TABLE 4 overleaf.

```
INJECT      1    4    7   10   13   16
    ───▶    2    5    8   11   14   17
            3    6    9   12   15   18
```

TABLE 4

| Measuring Point | Intensity of Output Light |
|---|---|
| 1 | 0.303 |
| 2 | 0.354 |
| 3 | 0.222 |
| 4 | 0.301 |
| 5 | 0.381 |
| 6 | 0.254 |
| 7 | 0.325 |
| 8 | 0.395 |
| 9 | 0.266 |
| 10 | 0.355 |
| 11 | 0.409 |
| 12 | 0.299 |
| 13 | 0.357 |
| 14 | 0.401 |
| 15 | 0.285 |
| 16 | 0.270 |
| 17 | 0.335 |
| 18 | 0.269 |

Represented graphically (arbitrary units):

```
INJECT      30.3  301  325  355  357  270
─────────>  354   381  395  409  401  335
            222   254  266  299  285  260
```

The results show that the output light intensity increases to a maximum about two thirds of the way along the array, before decreasing at the end. Illumination of this device with a strong light source gives a very bright display, which appeared by eye to be evenly distributed.

EXAMPLE 5

An array was assembled as described in Example 1, but using thirty nine 1 meter PMMA optical fibres (1.0 mm diameter), commercially available from Fibre Lightguides, mounted onto a PET film using a low $n_D$ adhesive comprising a copolymer of FX13, commercially available from 3M Company, and butyl acrylate (40:60 wt %) prepared by solution polymerisation in ethyl acetate and cast from ethyl acetate at 150 μm wet thickness h(50 μm dry thickness). The array was indented by application of the stamping tool of Example 1 at 5082.5 kg pressure for 2 minutes at 70° C. and a sheet of aluminised PET mounted on the reverse face as described in Example 3 to complete the assembly of the device. Light was injected into the device as described in Example 1 and the intensity of the output light measured at 12 points along the front panel of the device as indicated below. The results obtained are shown in TABLE 5 overleaf.

```
INJECT
─────────> 1 2 3 4 5 6 7 8 9 10 11 12
```

TABLE 5

| Measuring Point | Intensity of Output Light |
| --- | --- |
| 1 | 0.244 |
| 2 | 0.220 |
| 3 | 0.221 |
| 4 | 0.227 |
| 5 | 0.232 |
| 6 | 0.249 |
| 7 | 0.256 |
| 8 | 0.244 |
| 9 | 0.258 |
| 10 | 0.274 |
| 11 | 0.277 |
| 12 | 0.260 |

Represented graphically (arbitrary units):

```
INJECT
─────────> 244 220 221 227 232 249 256 244 258 274 277 260
```

"FX13" (3M Company) and "CY1311" and "ARALDITE" (Ciba Geigy) are all trade names/designations.

What is claimed is:

1. An illumination device comprising an illumination device for propagating light in a preselected direction, said fibre having a light emitting region, said light emitting region comprising a plurality of reflecting surfaces of optical quality extending into said fibre and arranged such that a portion of light propagating along said fibre and impinging upon said surfaces will be reflected out of said fibre by total internal reflection through a side wall thereof, at least one of said reflecting surfaces having a cross-sectional area less than that of said fibre, said reflecting surfaces varying in cross-sectional area and/or spacing such that light is emitted over said light emitting region substantially uniformly.

2. An illumination device according to claim 1 wherein the spacing between successive reflecting surfaces decreases as distance along said fibre in said preselected direction increases.

3. An illumination device according to claim 2 wherein the cross-sectional areas of said reflecting surfaces increase as distance along said fibre in said preselected direction increases.

4. An illumination device according to claim 1 wherein the cross-sectional areas of said reflecting surfaces increase as distance along said fibre in said preselected direction increases.

5. An illumination device according to claim 1 wherein each of said reflecting surfaces is substantially planar.

6. An illumination device according to claim 5 wherein the spacing between successive reflecting surfaces decreases as distance along said fibre in said preselected direction increases.

7. An illumination device according to claim 6 wherein the cross-sectional areas of said reflecting surfaces increase as distance along said fibre in said preselected direction increases.

8. An illumination device according to claim 5 wherein the cross-sectional areas of said reflecting surfaces increase as distance along said fibre in said preselected direction increases.

9. An illumination device according to claim 1 wherein each of said reflecting surfaces comprises a wall of a notch in said fibre.

10. An illumination device according to claim 9 wherein the spacing between successive reflecting surfaces decreases as distance along said fibre in said preselected direction increases.

11. An illumination device according to claim 10 wherein the cross-sectional areas of said reflecting surfaces increase as distance along said fibre in said preselected direction increases.

12. An illumination device according to claim 9 wherein the cross-sectional areas of said reflecting surfaces increase as distance along said fibre in said preselected direction increases.

13. An illumination device according to claim 9 wherein each of said reflecting surfaces is substantially planar.

14. An illumination device according to claim 13 wherein the spacing between successive reflecting surfaces decreases as distance along said fibre in said preselected direction increases.

15. An illumination device according to claim 14 wherein the cross-sectional areas of said reflecting surfaces increase as distance along said fibre in said preselected direction increases.

16. An illumination device according to claim 13 wherein the cross-sectional areas of said reflecting surfaces increase as distance along said fibre in said preselected direction increases.

17. An illumination device comprising an illumination device for propagating light in a preselected direction, said fibre having a light emitting region, said light emitting region comprising a plurality of reflecting surfaces of optical quality extending into said fibre and arranged such that a portion of light propagating along said fibre and impinging upon said surfaces will be reflected out of said fibre by total internal reflection through a side wall thereof, said reflecting surfaces having cross-sectional areas that vary such that the amount of light reflected out of said fibre by each of said reflecting surfaces is substantially equal.

18. An illumination device according to claim 17 wherein each of said reflecting surfaces is substantially planar.

19. An illumination device comprising a plurality of illumination devices for propagating light in a preselected direction, said fibres being aligned to form an array, said array having a light emitting region wherein each of said fibres has a plurality of reflecting surfaces of optical quality extending therein such that a portion of light propagating along any fibre of the array and impinging on said reflecting surfaces will be reflected out of its fibre by total internal reflection wherein the cross-sectional area of said reflecting surfaces increases as distance along said fibres increases in said preselected direction.

20. An illumination device comprising a plurality of illumination devices for propagating light in a preselected direction, said fibres being aligned to form an array, said array having a light emitting region wherein each of said fibres has a plurality of reflecting surfaces of optical quality extending therein such that a portion of light propagating along any fibre of the array and impinging on said reflecting surfaces will be reflected out of its fibre by total internal reflection wherein the cross-sectional area of said reflecting surfaces varies such that the amount of light reflected out of each fibre by each of said reflecting surfaces is substantially equal.

21. An illumination device comprising a plurality of illumination devices for propagating light in a preselected direction, said fibres being aligned to form an array, said array having a light emitting region wherein each of said fibres has a plurality of reflecting surfaces of optical quality extending therein such that a portion of light propagating along any fibre of the array and impinging on said reflecting surfaces will be reflected out of its fibre by total internal reflection wherein the cross-sectional area of the said reflecting surfaces and/or the spacing between said reflecting surfaces varies such that the light emitted over said light emitting region is substantially uniform.

* * * * *

UNITED STATES PATENT AND TRADEMARK OFFICE
CERTIFICATE OF CORRECTION

PATENT NO.: 5,432,876

DATED: July 11, 1995

INVENTOR(S): Roger H. Appeldorn, et al.

It is certified that error appears in the above-identified patent and that said Letters Patent is hereby corrected as shown below:

Column 2, lines 31 and 32, "rods, once" should read --rods. Once--;

Column 3, line 15, "spots'" should read --spots',--;

Column 3, lines 26, "Comprising" should read --comprising--;

Column 5, line 55, "in" should read --is--;

Column 6, line 68, "in accordance the invention" should read --in accordance with the invention--;

Column 8, line 24, "useful depending" should read --useful. Depending--;

Column 8, line 26, "$0 \leq O < 90°$" should read --$0 \leq angle < 90°$--;

Column 17, lines 58 and 59, "illumination device" (second occurrence) should read --optical fibre--;

Column 17, line 66, "wail" should read --wall--;

Column 18, lines 60 and 61, "illumination device" (second occurrence) should read --optical fibre--;

Column 19, line 8, "illumination devices" should read --optical fibres--;

UNITED STATES PATENT AND TRADEMARK OFFICE
CERTIFICATE OF CORRECTION

PATENT NO.: 5,432,876

DATED: July 11, 1995

INVENTOR(S): Roger H. Appeldorn, et al.

It is certified that error appears in the above-identified patent and that said Letters Patent is hereby corrected as shown below:

Column 19, line 20, "illumination devices" should read --optical fibres--; and

Column 20, line 10, "illumination devices" should read --optical fibres--.

Signed and Sealed this

Second Day of January, 2001

Attest:

Attesting Officer

Q. TODD DICKINSON

Commissioner of Patents and Trademarks

UNITED STATES PATENT AND TRADEMARK OFFICE
CERTIFICATE OF CORRECTION

PATENT NO.: 5,432,876 (Page 1 of 2)

DATED: July 11, 1995

INVENTOR(S): Roger H. Appeldorn, et al.

It is certified that error appears in the above-identified patent and that said Letters Patent is hereby corrected as shown below:

Column 2, lines 31 and 32, "rods, once" should read --rods. Once--;

Column 3, line 15, "spots'" should read --spots',--;

Column 3, lines 26, "Comprising" should read --comprising--;

Column 5, line 55, "in" should read --is--;

Column 6, line 68, "in accordance the invention" should read --in accordance with the invention--;

Column 8, line 24, "useful depending" should read --useful. Depending--;

Column 8, line 26, "$0 \leq O < 90°$" should read --$0 \leq angle < 90°$--;

Column 17, lines 58 and 59, "illumination device" (second occurrence) should read --optical fibre--;

Column 17, line 66, "wail" should read --wall--;

Column 18, lines 60 and 61, "Illumination device" (second occurrence) should read --optical fibre--;

Column 19, line 8, "illumination devices" should read --optical fibres--;

UNITED STATES PATENT AND TRADEMARK OFFICE
CERTIFICATE OF CORRECTION

PATENT NO.: 5,432,876

DATED: July 11, 1995

INVENTOR(S): Roger H. Appeldorn, et al.

It is certified that error appears in the above-identified patent and that said Letters Patent is hereby corrected as shown below:

Column 19, line 20, "illumination devices" should read --optical fibres--; and

Column 20, line 10, "illumination devices" should read --optical fibres--.

Signed and Sealed this

Eighth Day of May, 2001

Attest:

NICHOLAS P. GODICI

Attesting Officer     Acting Director of the United States Patent and Trademark Office

(12) REEXAMINATION CERTIFICATE (4576th)
United States Patent
Appeldorn et al.

(10) Number: US 5,432,876 C1
(45) Certificate Issued: May 21, 2002

(54) ILLUMINATION DEVICES AND OPTICAL FIBRES FOR USE THEREIN

(75) Inventors: Roger H. Appeldorn, Grant Township, Washington County, MN (US); Alan G. Hulme-Lowe, Bishops Stortford; Michael C. Lea, Harlow, both of (GB)

(73) Assignee: Minnesota Mining and Manufacturing Company, St. Paul, MN (US)

Reexamination Request:
No. 90/005,140, Oct. 5, 1998

Reexamination Certificate for:
Patent No.: 5,432,876
Issued: Jul. 11, 1995
Appl. No.: 07/963,056
Filed: Oct. 19, 1992

Certificate of Correction issued Jan. 2, 2001.

Certificate of Correction issued May 8, 2001.

(51) Int. Cl.[7] .............................. F21V 8/00; G02B 6/24
(52) U.S. Cl. ........................ 385/31; 362/554; 362/556; 385/47; 385/901
(58) Field of Search ............................ 385/15, 31, 32, 385/39, 44, 45, 47, 48, 123, 147, 901; 362/551, 552, 558, 559, 560, 554, 556

(56) References Cited

U.S. PATENT DOCUMENTS

| | | | |
|---|---|---|---|
| 2,909,857 A | 10/1959 | Wilson | 40/502 |
| 3,692,383 A | 9/1972 | Herod et al. | 385/147 |
| 3,829,675 A | 8/1974 | Mariani | 362/296 |
| 4,052,120 A | 10/1977 | Sick et al. | 385/33 |
| 4,128,332 A | 12/1978 | Rowe | 355/67 |
| 4,141,058 A | 2/1979 | Mizohata et al. | 362/558 |
| 4,172,631 A | 10/1979 | Yevick | 385/115 |
| 4,196,962 A | 4/1980 | Sick | 385/146 |
| 4,561,043 A | 12/1985 | Thompson | 362/566 |
| 4,585,298 A | 4/1986 | Mori | 385/31 |
| 4,678,279 A | 7/1987 | Mori | 362/551 |
| 4,717,226 A | 1/1988 | Mori | 385/39 |
| 4,726,641 A | 2/1988 | Mori | 385/39 |
| 4,730,883 A | 3/1988 | Mori | 362/552 |
| 4,732,442 A | 3/1988 | Mori | 362/551 |
| 4,733,332 A | 3/1988 | Yamashita et al. | 362/582 |
| 4,765,701 A | 8/1988 | Cheslak | 362/560 |
| 4,778,989 A | 10/1988 | Hagemayer et al. | 250/227.24 |
| 4,872,739 A | 10/1989 | Kahn et al. | 385/24 |
| 5,036,435 A | 7/1991 | Tokuda et al. | 362/31 |
| 5,292,320 A | 3/1994 | Brown et al. | 606/15 |
| 5,496,308 A | 3/1996 | Brown et al | 606/15 |

FOREIGN PATENT DOCUMENTS

| EP | 0 598 984 | 6/1994 |
|---|---|---|
| FR | 2525777 | 10/1983 |
| JP | 56-32104 | 4/1981 |
| JP | 58-7604 | 1/1983 |
| JP | 63-253903 | 10/1988 |

*Primary Examiner*—John D. Lee

(57) ABSTRACT

An optical fibre has a light emitting region. In the light emitting region are reflecting surfaces, at least one of which has a cross sectional area less than that of the fibre. Light striking the reflecting surfaces will be reflected out of the fibre.

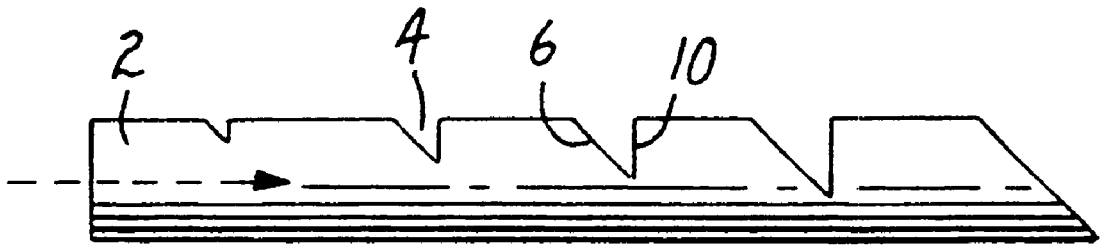

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1–21 is confirmed.

New claims 22–25 are added and determined to be patentable.

*22. An illumination device comprising an optical fibre for propagating light in a preselected direction, said fibre having a light emitting region, said light emitting region comprising a plurality of reflecting surfaces of optical quality extending into said fibre and arranged such that a portion of light propagating along said fibre and impinging upon said surfaces will be reflected out of said fibre by total internal reflection through a side wall thereof, at least one of said reflecting surfaces having a cross-sectional area less than that of said fibre, said reflecting surfaces varying in spacing such that light is emitted over said light emitting region substantially uniformly.*

*23. An illumination device comprising an optical fibre for propagating light in a preselected direction, said fibre having a light emitting region, said light emitting region comprising a plurality of reflecting surfaces of optical quality extending into said fibre and arranged such that a portion of light propagating along said fibre and impinging upon said surfaces will be reflected out of said fibre by total internal reflection through a side wall thereof, at least one of said reflecting surfaces having a cross-sectional area less than that of said fibre, and wherein spacing between said reflecting surfaces decreases as distance along said fibre in said preselected direction increases, such that light is emitted over said light emitting region substantially uniformly.*

*24. An illumination device comprising a pluality of optical fibres for propagating light in a preselected direction, said fibres being aligned to form an array, said array having a light emitting region wherein each of said fibres has a plurality of reflecting surfaces of optical quality extending therein such that a portion of light propagating along any fibre of the array and impinging on said reflecting surfaces will be reflected out of its fibre by total internal reflection, and wherein spacing between said reflecting surfaces varies such that the light emitted over said light emitting region is substantially uniform.*

*25. An illumination device comprising a plurality of optical fibres for propagating light in a preselected direction, said fibres being aligned to form an array, said array having a light emitting region wherein each of said fibres has a plurality of reflecting surfaces of optical quality extending therein such that a portion of light propagating along any fibre of the array and impinging on said reflecting surfaces will be reflected out of its fibre by total internal reflection, and wherein spacing between said reflecting surfaces decreases as distance along said fibre in said preselected direction increases, such that the light emitted over said light emitting region is substantially uniform.*

\* \* \* \* \*